Dec. 2, 1969   D. C. GRAY   3,481,857
APPARATUS FOR CHLORINATING WATER
Filed Oct. 3, 1966   2 Sheets-Sheet 1

INVENTOR
David C. Gray
BY
TW Secrest
ATTORNEY

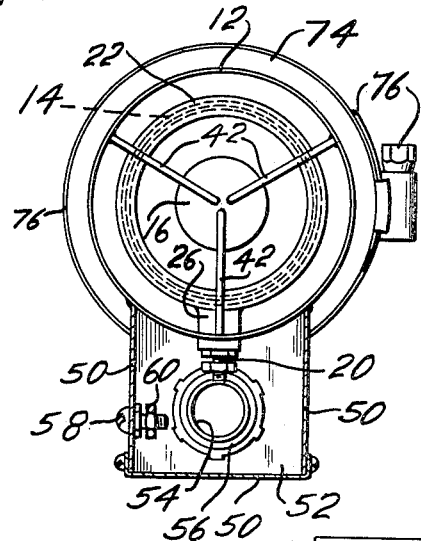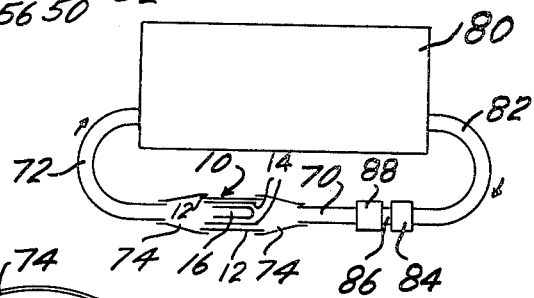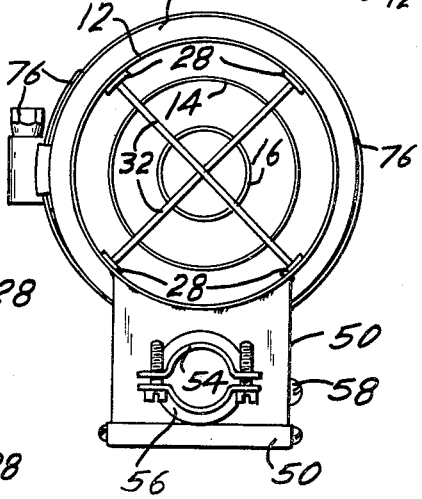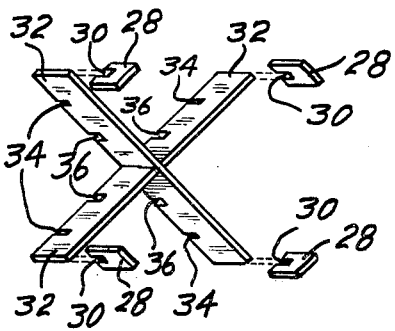

United States Patent Office 3,481,857
Patented Dec. 2, 1969

3,481,857
APPARATUS FOR CHLORINATING WATER
David C. Gray, 3848 Chilberg Place SW.,
Seattle, Wash. 98116
Filed Oct. 3, 1966, Ser. No. 583,529
Int. Cl. E04h 3/20; B01k 3/04
U.S. Cl. 204—272    3 Claims

ABSTRACT OF THE DISCLOSURE

Flow-through, electrolytic water chlorinating apparatus using three concentric electrodes, the middle electrode being of expanded metal.

---

This invention is directed to a method and apparatus for chlorinating water, especially, water in swimming pools.

In recent years the building of private, individual swimming pools in the United States has become quite extensive. This has introduced a maintenance problem with respect to the purification of the water used in the swimming pool. As is well known it is necessary to purify the water, otherwise it becomes unfit for swimming purposes. One of the ways to purify the water is by the introduction of chlorine either as gaseous chlorine, liquid chlorine or as a hypochlorite. The chlorine acts upon the bacteria and other impurities in the water so as to purify the water. The chlorine may be added as gaseous chlorine or as a liquid solution of chlorine such as hydrochloric acid and hypochlorous acid. The introduction of a liquid or gaseous chlorine in the swimming pool is inherently dangerous. The handling of liquid and gaseous chlorine introduces problems. For example, if the container should break the person handling the chlorine may become asphyxiated or may be severely hurt. Further, the introduction of chlorine as hypochlorous acid or in a form of bleach, while not too dangerous, does carry some danger with it. Therefore, it is desirable to stay away from liquid or gaseous chlorine or chlorine in a liquid solution such as an aqueous solution. Further, the introduction of chlorine in this fashion temporarily elevates the chlorine concentration to such a high degree in the swimming pool that the eyes of the swimmers are irritated and it is no longer a pleasure to swim. A desirable chlorine concentration for swimming purposes is approximately from 0.1 to 0.5 part per million of chlorine. A higher concentration than this causes irritation to the eyes of the swimmer. Further, with the passage of time the chlorine concentration decreases if added as a unit either as liquid or gaseous chlorine or in an aqueous solution, and the concentration of the chlorine falls below the desirable range. Therefore, at this stage the concentration of the chlorine is no longer as effective as it once was. A further manner of adding chlorine or a compound of chlorine to swimming pools to assist in purifying the water is by the addition of sodium hypochlorite or calcium hypochlorite. These may be added in a solid form or in an aqueous solution. As is well known the hypochlorite functions to purify the swimming water. Once again, the addition of the sodium hypochlorite or calcium hypochlorite to the swimming pool temporarily elevates the concentration of the chlorine above the desirable range of 0.1–0.5 part per million of chlorine so as to cause irritation to the eyes of the swimmer. With the passage of time the concentration of the available chlorine falls below the desirable range and the purification properties are severely limited.

I have worked around swimming pools; assisted in the building and installing of swimming pools; and have assisted in the installing of auxiliary equipment for maintaining the water in the swimming pool in a sanitary state so that the swimmer can enjoy swimming in the pool. With this background and having a good idea of the commercially available equipment for chlorinating and purifying a swimming pool I have made this invention in regard to an apparatus for electrolyzing a saline solution to form chlorine and which chlorine is introduced into the water in the swimming pool so as to kill the bacteria and assist in purifying the water. This apparatus is so connected with the water in the swimming pool that water may be taken from the swimming pool, flowed through the apparatus wherein chlorine is generated, and then flowed back to the swimming pool. Accordingly, an object of this invention is to provide an apparatus which will accept the full flow of water from a swimming pool so as to generate chlorine in said water; an apparatus which is easy to install with respect to the swimming pool; an apparatus which has electrodes on both sides of another electrode so as to have a large surface area for the volume of the apparatus; an apparatus which lends itself to ease of removing, cleaning and installing the electrodes and the unit proper; an apparatus which requires only one gasket; an apparatus which is inexpensive to maintain; an apparatus which is inexpensive to manufacture; an apparatus which has a long and useful life for generating chlorine in water; an apparatus which lends itself to limiting the concentration of chlorine in water in a swimming pool; an apparatus wherein there is substantially no buildup of deposits on the electrodes so as to foul the electrodes and decrease the efficiency of operation; an apparatus which provides continuing automatic chlorination for as long as there is salt in the swimming pool and the apparatus is supplied with sufficient electricity; and, an apparatus which is safe to use and does not require the presence of liquid or gaseous chlorine or other harmful chemicals and requires only a common day chemical, common table salt.

These and other important objects and advantages of the invention will be more particularly brought forth upon reference to the accompanying drawings, the detailed specification of the invention and the appended claims.

Figure 2:
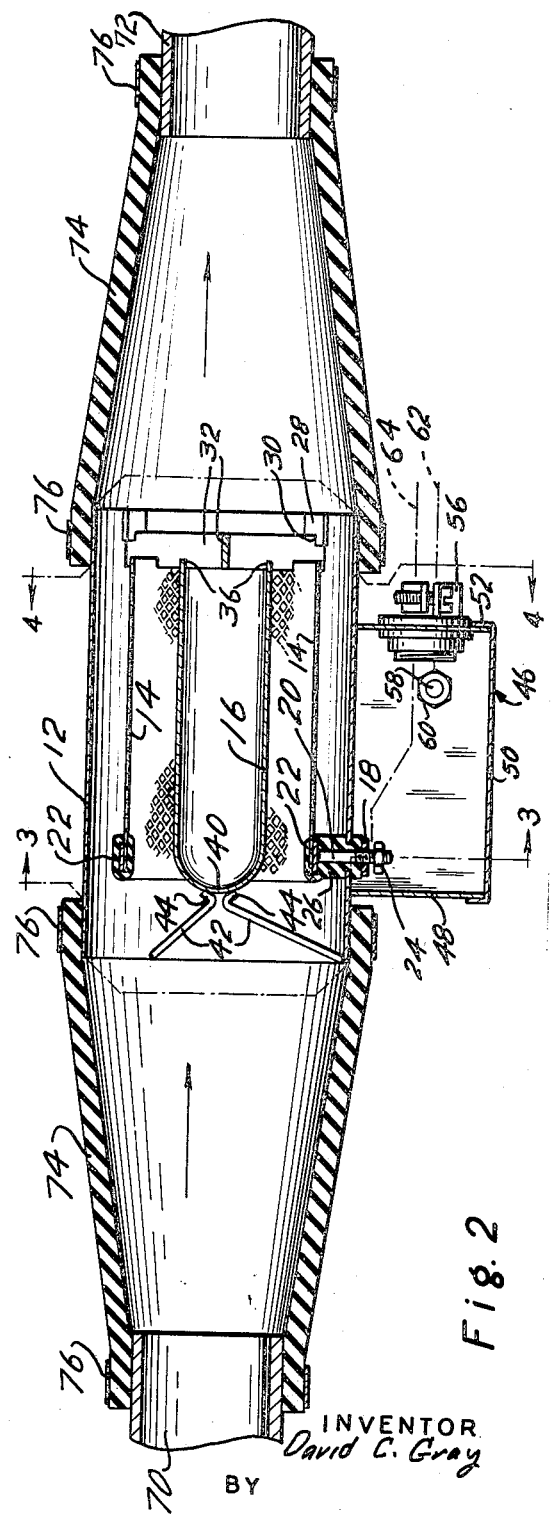
FIGURE 2 is a longitudinal cross-sectional view of the invention and shows the manner in which the components of the invention are arranged and also the manner in which the invention is connected into the line through which flows the stream of water from the swimming pool.

FIGURE 3, taken on line 3—3 of FIGURE 2, is a lateral cross-sectional view illustrating the arrangement of th electrodes in the invention;

FIGURE 4, taken on line 4—4 of FIGURE 2, is a lateral cross-sectional view also illustrating the arrangement of the electrodes in the invention;

FIGURE 5 is a perspective exploded view illustrating a spacer component of the invention; and FIGURE 6 is a schematic illustration of the invention in use in conjunction with a swimming pool.

In the drawings it is seen that the invention comprises an electrolysis unit 10. The electrolysis unit 10 comprises a first tube 12. Also, there is a second tube 14 and a third tube 16. Actually, the third tube 16 is more in the configuration of a thimble. The second tube 14 is positioned in a concentric manner with respect to the first tube 12 and the third tube 16. In the wall of the tube 12 there is an opening or passageway 18. A bolt 20 is attached or riveted to the tube 14 as illustrated at 22. Also, this bolt 20 projects through the opening 18 and outside of the tube 12. The bolt 20 is externally threaded and as illustrated there is a nut 24 on the bolt 20. As is illustrated in FIGURE 2 the bolt 20 is insulated from the tube 12 by means of an insulating material 26. The insulating material 26 may be neoprene, an epoxy resin, polyvinyl chloride to name a few satisfactory plastic insulating materials. To further assist in the positioning of the second tube 14 inside of the first tube 12 there is employed a spacing means. On the inside wall of the tube 12 and at ninety (90°) degree angles with respect to each other there are welded four brackets 28. The brackets 28 have a notch 30. The brackets 28 and the notch 30 receive bars 32 having notches 34 and 36. The brackets 28 may be of nickel. The spacer bars 32 may be of a plastic such as a phenol-formaldehyde plastic and comprise flat strips of the plastic. The brackets 28 are welded onto the interior surface of the first tube 12. Then, the spacer bars 32 are positioned in the slots 30 and the brackets 28. Then the second tube 14 is positioned in the slots 34 of the spacer bars 32. In FIGURE 2 it is seen that one end of the first tube 14 is positioned in the slots 34 of the spacer bars 32 while the other end is positioned by means of the bolt 20. In this manner the second tube 14 is definitely positioned in a concentric relationship with the first tube 12. Also, the second tube 14 is electrically insulated from the first tube 12.

The third tube or thimble 16 is in a concentric relationship with the first tube 12 and the second tube 14. The open end of the third tube 16 fits with the slots 36 in the spacer bars 32 so as to definitely position the open end. In FIGURES 2 and 3 it is seen that the closed end 40 of the third tube 16 is definitely positioned by means of three fingers 42. These fingers 42 have a downward hook 44. The hook 44 is soldered to the closed end 40 and the other end of the finger 42 is soldered to the inside of the first tube 12. In this manner it is seen that the closed end of the third tube 16 is definitely positioned with respect to the first tube 12 and the second tube 14. Further, it is seen that the first tube 12 and the third tube 16 are electrically connected and are electrically insulated from the second tube 14.

The first tube 12, the third tube 16 and the fingers 42 may be of nickel. The brackets 28 may be of nickel. The second tube 14 comprises a base of expanded metal such as a base tantalum. Then, the tantalum is coated with platinum to a thickness of approximately five (5) mils or about five one-thousandths (0.005") of an inch. We have found from experience that this combination of nickel and platinum coated on tantalum gives an electrolysis apparatus which has a relatively long life. The length of the first tube 12 is approximately six (6") inches and the inside diameter is approximately three (3") inches. The length of the second tube 14 is approximately four (4") inches and the inside diameter is approximately two (2") inches. The length of the third tube 16 is approximately four (4") inches and the inside diameter is approximately one (1") inch.

There is welded onto the outside surface of the first tube 12 a housing 46. The housing 46 has a bottom 48, side walls 50 and a top wall 52. In the top wall 52 there is an opening 54. An electrical connector 56 fits into the opening 54. A bolt 58 projects through an opening in the side wall 50 and there is screwed onto the bolt 58 a nut 60. A lead-in wire 62 connects with the bolt 58 and a lead-in wire 64 connects with the bolt 20. The lead-in wires 62 and 64 are shown in phantom in FIGURE 2. These lead-in wires 62 and 64 connect with a rectified source of current or a direct current source.

Figure 1:
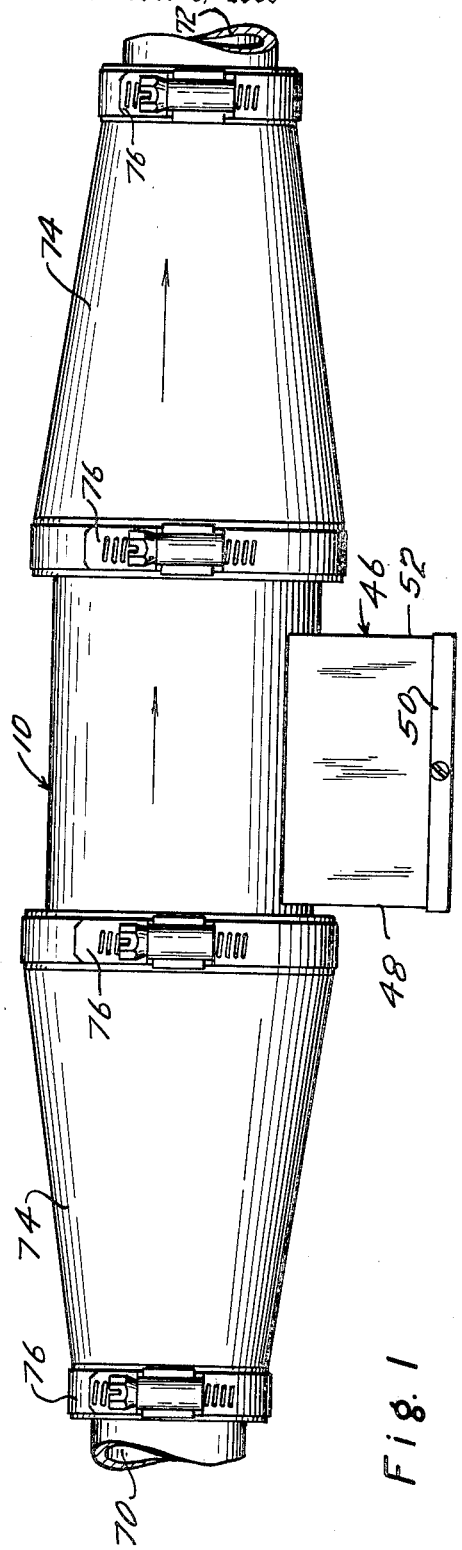
FIGURE 1 is a view looking at the outside of the invention and shows the manner in which the invention is connected into the line through which flows a stream of the main body of the water in the swimming pool.

The electrolysis unit can connect with a first pipe 70 and a second pipe 72 by means of adapters 74. It is seen in FIGURES 1 and 2 that there are two adapters 74. These adapters are in the configuration of a frustum of a cone and expand outwardly going from the first pipe 70 to the electrolysis unit 10 and going from the second pipe 72 to the electrolysis unit 10. The adapters 74 may be of plastic or may be of reinforced rubber. The adapters 74 are somewhat flexible and can be bent and twisted to a degree. The adapter 74 is attached to the pipe 70 and to the pipe 72 and to the electrolysis unit 10 by means of pipe clamps 76. The pipe 70 connects with the source of swimming pool water so as to introduce a saline solution into the electrolysis apparatus 10. The pipe 72 connects with the return line leading to the swimming pool so as to introduce chlorine into the swimming pool.

In FIGURE 6 there is a schematic illustration of a swimming pool 80 having an outlet pipe 82 which connects with a motor and pump 84. The motor and pump 84 connect with a pipe 86. The pipe 86 connects with a filter unit 88. The filter unit 88 connects with the pipe 70. The pipe 70 connects with the electrolysis unit 10. The electrolysis unit 10 connects with the pipe 72 which leads into the swimming pool 80.

A person may add common table salt, sodium chloride, to the swimming pool to build up the concentration to one (1) in the range of approximately one-fourth (¼%) percent to three (3%) percent. Then, upon circulating the saline solution from the swimming pool through the electrolysis unit 10, and with the source of electricity connected to the electrolysis unit 10 there is produced sodium hypochlorite. As is well known sodium chloride upon being electrolyzed produces chlorine and sodium. The sodium reacts with water to give sodium hydroxide and hydrogen. The chlorine reacts with water to give hydrochloric acid and hypochlorous acid. The sodium hydroxide and the hypochlorous acid react to give water and sodium hypochlorite. The sodium hypochlorite and, in particular, the hypochlorous ion oxidize the impurities present in the water, such as bacteria, to purify the water.

In some instances it may be desirable to add a small amount of calcium chloride to the water to assist in the formation of the oxidizing agent, the hypochlorous ion. The calcium chloride may be in a small concentration of one-half to one (½–1%) percent. Further, it may be desirable to add buffering agents in small concentrations such as sodium diabasic phosphate, sodium pyrophosphate, sodium hexametaphosphate, sodium tripolyphosphate and sodium biborate. The buffering agents assist in maintaining the concentration of the oxidizing agent even though the electrolytic cell has been turned off.

The power requirements for the electrolytic cell 10 may vary. For example, there may be a direct current source of electricity at thirteen (13) volts and at eighteen (18) amps. This power requirement may vary upward to a direct current source of three hundred and fifty (350) volts and two hundred and fifty (250) amps. However, for swimming pools with a low concentration of saline solution it is desirable to use a low power requirement. This is especially so if the electrolytic unit 10 is in continual use during the day. When in continual use it is only necessary to circulate some of the saline solution in the swimming pool through the electrolytic cell 10 so as to continually purify a portion of the swimming pool. In this manner the swimming pool is continually being purified and also the power requirement is held to a low figure.

In other units I have noticed that some salts build up on the electrodes. For example, salts in the water form on the electrodes so as to decrease the electrolytic action and hinder the formation of the oxidizing agent. As is well known in almost all water, even the softest water, there are some salts. These salts may be salts of calcium and magnesium. The concentration of the salts around the electrodes during electrolysis increases and some of the salts deposit on the electrodes to cut down on the effective surface area of the electrodes and thereby decrease the effective electrolytic action of the electrodes. With the electrodes used in the electrolytic cell 10, nickel and platinum electrodes, when the electrolytic cell 10 is turned off and is not producing hypochlorous acid a galvanic action takes place so that the buildup of calcium and magnesium salts on the nickel electrode is reversed. By this galvanic action the salts are undercut or eaten away at the surface of the nickel electrode and the salts fall off of the electrode. In this manner the electrodes of the electrolytic cell 10 are self-cleaning due to the galvanic action. As a result the electrodes are usually in a clean state and ready for effective action.

From the foregoing it is seen that the electrolytic cell 10 provides a large surface area for electrolysis in a relatively small volume. This is possible because the anode, second tube 14 of platinum, is both inside a cathode, the first nickel tube 12 and outside the cathode, the third nickel tube 16. In this manner the anode has two effective cathodes. Further, as previously stated, the first nickel tube 12 and the third nickel tube 16 are electrolytically tied together by means of the fingers 42. Because of the small volume the electrolytic cell 10 occupies it is possible to bury it in the ground so as to be hidden from view.

In this invention it is seen that the swimming pool is used as a reservoir for the saline solution. The saline solution is withdrawn from the reservoir and passed through the electrolytic cell 10 to generate the oxidizing agent for purification purposes.

Having presented my invention what I claim is:

1. An apparatus for chlorinating water, said apparatus comprising:
   (a) a first tube;
   (b) said first tube being a first electrode;
   (c) a second tubular electrode inside the first tube;
   (d) said second electrode being of expanded metal;
   (e) a third electrode inside the second electrode;
   (f) a source of electricity connecting with the first electrode, with the second electrode and with the third electrode;
   (g) a first adapter connecting with a first pipe and with one end of the first tube; and
   (h) a second adapter connecting with a second pipe and with the other end of the first tube.

2. An apparatus according to claim 1, said apparatus comprising:
   (a) said second tube comprising platinum;
   (b) said third electrode being tubular;
   (c) said first and third electrodes comprising nickel; and
   (d) said first and second adapters being flexible.

3. An apparatus according to claim 2 further including means for connecting said pipes into the water circulating system of a swimming pool.

References Cited

UNITED STATES PATENTS

| | | | |
|---|---|---|---|
| 820,113 | 5/1906 | Hinkson | 204—272 X |
| 1,020,001 | 3/1912 | Van Pelt | 204—272 |
| 1,440,091 | 12/1922 | Long | 204—272 |
| 1,930,830 | 10/1933 | Twombly | 204—272 |
| 3,282,823 | 11/1966 | Richards | 204—272 |
| 3,378,479 | 4/1968 | Colvin et al. | 204—248 |

JOHN H. MACK, Primary Examiner

A. C. PRESCOTT, Assistant Examiner

U.S. Cl. X.R.

204—149, 275; 210—169